United States Patent
Andrina

(10) Patent No.: US 9,062,805 B2
(45) Date of Patent: Jun. 23, 2015

(54) QUICK-CONNECTION HYDRAULIC COUPLING JOINT

(71) Applicant: Giovanni Andrina, Bosconero (IT)

(72) Inventor: Giovanni Andrina, Bosconero (IT)

( * ) Notice: Subject to any disclaimer, the term of this patent is extended or adjusted under 35 U.S.C. 154(b) by 0 days.

(21) Appl. No.: 14/184,442

(22) Filed: Feb. 19, 2014

(65) Prior Publication Data

US 2014/0230933 A1    Aug. 21, 2014

(30) Foreign Application Priority Data

Feb. 20, 2013   (IT) .............................. TO2013A0138

(51) Int. Cl.
  *F16L 37/32*    (2006.01)
  *F16L 37/367*   (2006.01)
  *E02F 3/36*     (2006.01)

(52) U.S. Cl.
  CPC ............. *F16L 37/367* (2013.01); *E02F 3/3654* (2013.01)

(58) Field of Classification Search
  CPC ........... F16L 29/04; F16L 37/62; F16L 37/30;
       F16L 37/28; F16L 37/256; F16L 37/33;
       F16L 37/373; F16L 37/367; F16L 37/35;
       F16L 37/36; E02F 3/36; E02F 3/3654
  USPC .................. 137/614, 614.01, 614.03, 614.05,
         137/614.06, 637–637.5; 251/149.9
  See application file for complete search history.

(56) References Cited

U.S. PATENT DOCUMENTS

| 193,078 | A | * | 7/1877 | Eames ...................... 137/614.01 |
| 314,699 | A | * | 3/1885 | Mark ......................... 285/148.3 |
| 593,119 | A | * | 11/1897 | Pugh ........................ 137/614.03 |
| 625,783 | A | * | 5/1899 | Miller et al. ............. 137/637.05 |
| 803,648 | A | * | 11/1905 | Williams ..................... 137/614 |
| 836,344 | A | * | 11/1906 | Schumacher ................ 137/614 |
| 1,131,820 | A | * | 3/1915 | Bushey .................... 137/637.05 |
| 4,809,747 | A | * | 3/1989 | Choly et al. ............. 137/614.06 |
| 4,989,638 | A | * | 2/1991 | Tervo ....................... 137/614.01 |
| 5,095,946 | A | * | 3/1992 | McLennan ............... 137/614.01 |
| 5,628,344 | A | * | 5/1997 | Roberts .................... 137/614.06 |

FOREIGN PATENT DOCUMENTS

| EP | A1-1 566 490 | 6/2008 |
| EP | A1-2 230 435 | 9/2010 |
| WO | WO-A1-2008-071012 | 6/2008 |

* cited by examiner

*Primary Examiner* — Craig Schneider
*Assistant Examiner* — Craig J Price
(74) *Attorney, Agent, or Firm* — Jennifer L. Bales; Macheledt Bales LLP

(57) ABSTRACT

A quick-connection hydraulic coupling joint (1) is described, comprising a female connection component (1a) equipped with a first passage duct (3a) of a pressurized working fluid connected with a first passage opening (5a) of such fluid, and a male connection component (1b) equipped with a second passage duct (3b) of such fluid connected with a second passage opening (5b) of such fluid, such male connection component (1b) being equipped with a projecting connection element (7b) on the surface of which such second passage opening (5b) is arranged, and such female connection component (1a) being equipped with a corresponding seat (7a) on the surface of which such first passage opening (5a) is arranged and is adapted to house therein such projecting connection element (7b) in order to share a common flow axis F-F of such fluid placed at an angle α<<90° with respect to a virtual, front connection interface plane P.

9 Claims, 6 Drawing Sheets

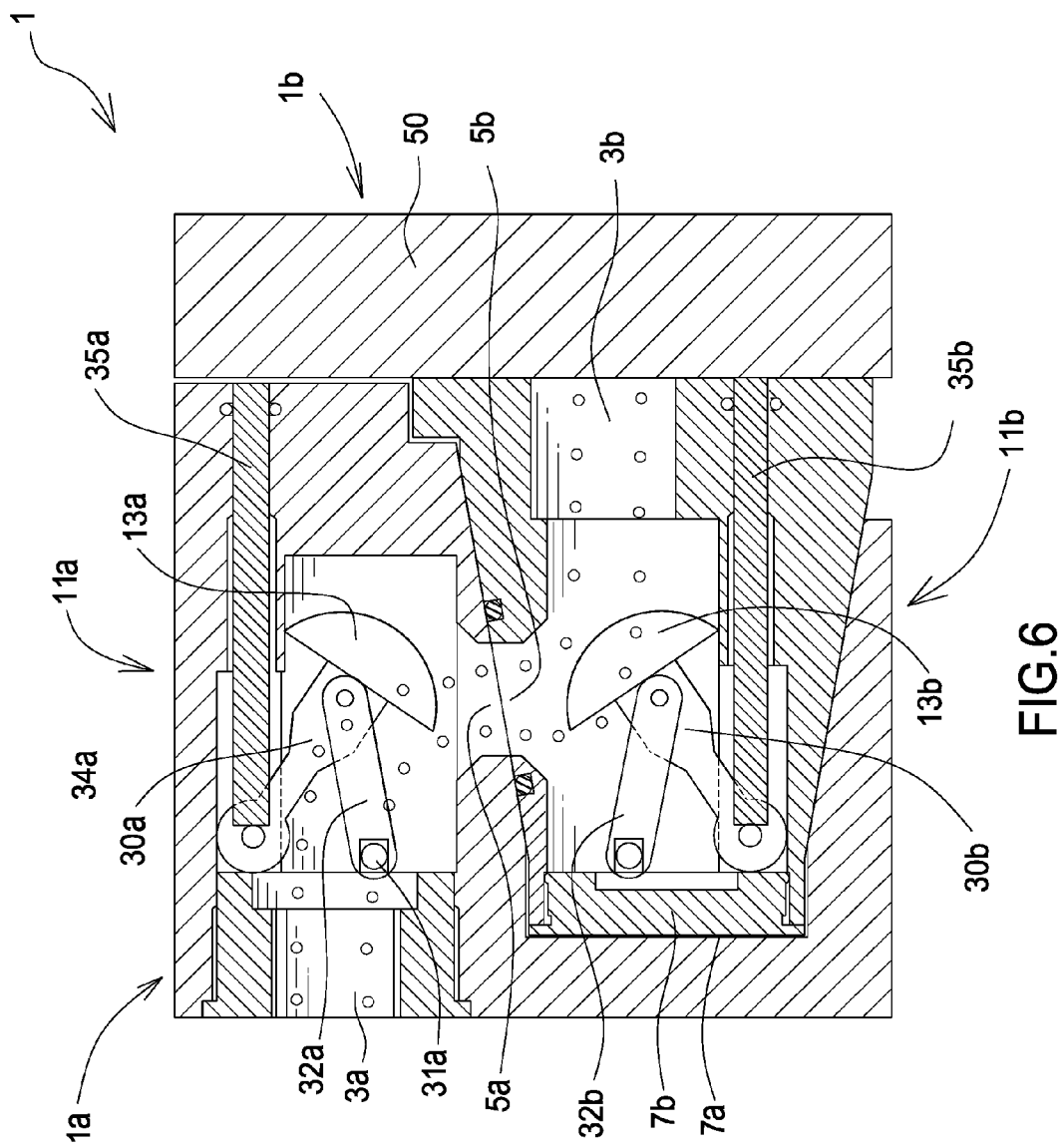

QUICK-CONNECTION HYDRAULIC COUPLING JOINT

FIELD OF THE INVENTION

The present invention refers to a quick-connection hydraulic coupling joint aimed in particular to connect elements of machine tools or excavation, demolition or earth-mover machines, for example to connect a tool to an handling fixture, such as the articulated arm of an excavator, or the like.

BACKGROUND ART

Currently, hydraulic coupling joints which are usually employed in the above mentioned applications are of the type with front coupling: this implies that the detachment force of such joints, generated by the internal pressure of the working fluid (working pressure), tries to move away-detach the male/female components of the joints which, consequently, must be equipped with adequate and sturdy fastening members which keep them connected.

This means that, if such components must be jointed or disjointed under pressure, they create difficulties when manoeuvring, especially in manual operations, generating forces which can be managed with difficulty: it must be noted, for example, that, for a ¾-inch (1.9 cm) joint at the working pressure of 200 bar (20 MPa), generally a detachment force over 1200 Kg is obtained.

Documents EP-A1-1 566 490, EP-A1-2 230 435 and WO-A1-2008/071012 disclose hydraulic joints according to the preamble of claim 1.

SUMMARY OF THE INVENTION

Therefore, object of the present invention is solving the above prior art problems, by providing a quick-connection hydraulic coupling joint in which the detachment force of the components of such joint generated by the pressurised working fluid remains inside the joint itself and generates a minimum moving-away resulting force, which can be easily counteracted by weak retention systems, since the force to be counteracted is minimum.

Another object of the present invention is providing a quick-connection hydraulic coupling joint which can be easily made with multiple channels, due to the fact that, even if the forces are multiplied for every connection, they do not generate detachment effects of the components of the joint itself.

Moreover, an object of the present invention is providing a quick-connection hydraulic coupling joint which has much smaller sizes with respect to what is proposed by the prior art, not having to require the insertion of sturdy and bulky retention systems.

The above and other objects and advantages of the invention, as will appear from the following description, are obtained with an hydraulic coupling joint as claimed in claim 1. Preferred embodiments and non-trivial variations of the present invention are the subject matter of the dependent claims.

It is intended that all enclosed claims are an integral part of the present description.

It will be immediately obvious that numerous variations and modifications (for example related to shape, sizes, arrangements and parts with equivalent functionality) can be made to what is described, without departing from the scope of the invention as appears from the enclosed claims.

BRIEF DESCRIPTION OF THE DRAWINGS

The present invention will be better described by some preferred embodiments thereof, provided as a non-limiting example, with reference to the enclosed claims, in which:

FIG. 6 shows the quick-connection hydraulic coupling joint of FIG. 5 in a closed configuration.

DETAILED DESCRIPTION OF PREFERRED EMBODIMENTS

Figure 1:
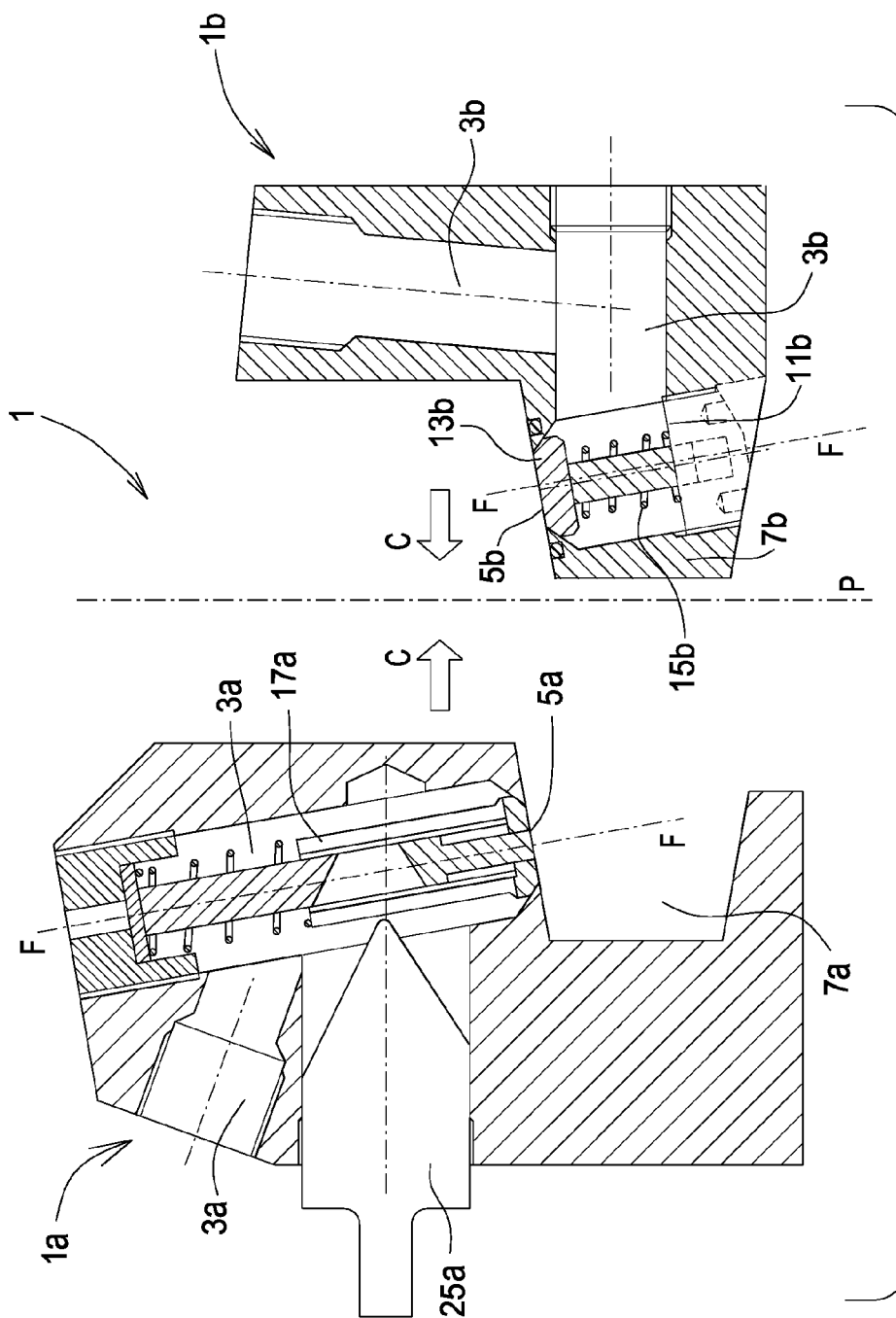
FIG. 1 shows a side sectional view of a preferred embodiment of the quick-connection hydraulic coupling joint according to the present invention in its disconnection position.
Figure 2:
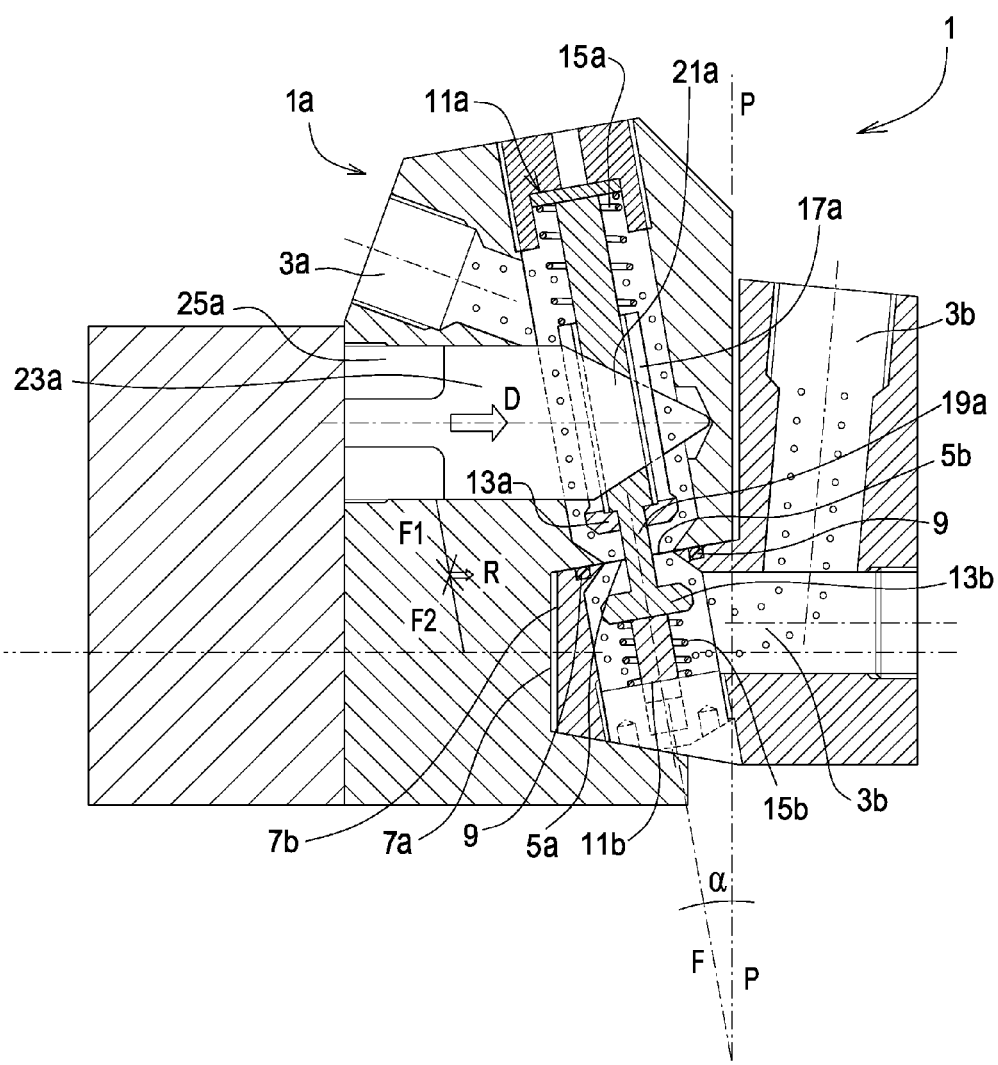
FIG. 2 shows a side sectional view of the quick-connection hydraulic coupling joint of FIG. 1 in its connection position.

With reference to the Figures, it is possible to note that the quick-connection hydraulic coupling joint 1 according to the present invention comprises at least one female connection component 1$a$ and at least one male connection component 1$b$, such female connection component 1$a$ being equipped with at least one first passage duct 3$a$ of at least one pressurised working fluid (for example oil) connected with at least one first passage opening 5$a$ of such fluid, such male connection component 1$b$ being equipped with at least one second passage duct 3$b$ of at least such pressurised working fluid connected with at least one second passage opening 5$b$ of such fluid, such male connection component 1$b$ being equipped with at least one projecting connection element 7$b$ on the surface of which such second passage opening 5$b$ is arranged, and such female connection component 1$a$ being equipped with a corresponding seat 7$a$ on the surface of which such first passage opening 5$a$ is arranged and is adapted to house therein such projecting connection element 7$b$ when the joint 1 according to the present invention is in its connection position (like the one, for example, shown in FIG. 2, obtained taking the female connection component 1$a$ and the male connection component 1$b$ one against the other according to the direction of arrows C of FIG. 1, by inserting the projecting connection element 7$b$ inside the seat 7$a$), to take such first passage opening 5$a$ next to and in fluidic connection with such second passage opening 5$b$ in order to share a common flow axis F-F of such working fluid passing through such first passage duct 3$a$, such first passage opening 5$a$, such second passage duct 3$b$ and such second passage opening 5$b$ (for example, along the flow trajectories roughly designated with dotted lines in FIG. 2), or vice versa.

Preferably, such projecting connection element 7$b$ has a section substantially shaped as a wedge or, as shown in the Figures, as an isosceles trapezoid rotated by 90°, such seat 7$a$ consequently having a corresponding shape: such passage openings 5$a$, 5$b$ are therefore preferably on two plane, adjoining faces of such projecting connection element 7$b$ and of such seat 7$a$.

Preferably, between such first passage opening 5a and such second passage opening, at least one sealing element 9 is interposed, still more preferably composed of at least one gasket of an OR-ring type.

According to the invention, when such female connection component 1a and such male connection component 1b are in their connection position, they share a virtual, front connection interface plane P subtending with such flow axis F-F an angle $\alpha \neq 90°$, namely $\alpha << 90°$, such angle $\alpha$ being preferably included between 5° and 15°, and still more preferably substantially equal to 10°: in such a way, it can be noted from FIG. 2 that the vector sum of the forces, respectively F1 and F2, generated by the pressurised working fluid passing through such first passage duct 3a, such first passage opening 5a, such second passage duct 3b and such second passage opening 5b are wholly counteracted by the walls defining the seat 7a of the female connection component 1a and generate a component R of the resulting force orthogonal with the virtual interface plane P, which tends to separate the female connection component 1a from the male connection component 1b, having a value substantially lower than the value of the forces F1 and F2, and thereby capable of being easily counteracted even only through the friction generated in the contact of the external surfaces of the projecting connection element 7b with the internal surfaces of the corresponding seat 7a inside which it is inserted and facilitating, at the same time, the voluntary detachment operations of such components 1a, 1b of the joint 1 according to the present invention.

Preferably, such first passage opening 5a is equipped with first opening/closing means 11a of such first opening 5a and such second passage opening 5b is equipped with second opening/closing means 11b of such second opening 5b in such way as to allow/prevent the passage of the working fluid through such openings 5a, 5b: still more preferably, such second opening/closing means 11b operatively cooperate with such first opening/closing means 11a.

In particular, such second opening/closing means 11b comprise at least one second closing plug 13b spontaneously taken to close (such as shown, for example, in particular in FIG. 1) of the respective second passage opening 5b by at least one respective second elastic means 15b, preferably composed of at least one coiled spring coaxial with the flow axis F-F of the working fluid.

Such first opening/closing means 11a comprise at least one first closing plug 13a spontaneously taken to close the respective first passage opening 5a by at least one respective first elastic means 15a, also preferably composed of at least one coil spring coaxial with the flow axis F-F of the working fluid. Moreover, such first closing plug 13a is integral with at least one end of a bush 17a axially sliding along such flow axis F-F, on an opposite end of such bush 17a acting under pressure on such first elastic means 15a: inside such bush 17a, at least one thrusting element 19a is in turn axially sliding along such flow axis F-F, such thrusting element 19a operatively cooperating with such second closing plug 13b to take this latter one from its closing position of the second opening 5b to its opening position of such opening 5b.

In particular, such bush 17a and such thrusting element 19a comprise at least one seat for inserting the enlarging end 21a of at least one enlarging element 23a, such seats being shaped in such a way that, when such enlarging end 21a is pushed (for example along the direction shown by arrow D in FIG. 2 when the female connection component 1a and the male connection component 1b are pushed one against the other along the direction of arrows C in FIG. 1 inserting the projecting connection element 7b inside the seat 7a) inside such seats, for example through a suitable sliding duct 25a, the bush 17a is progressively pushed to compress the first elastic means 15a, taking the first closing plug 13a integral therewith to free the first passage opening 5a; in parallel, when such enlarging end 21a is pushed inside such seat, the thrusting element 19a is progressively pushed against the second closing plug 13b compressing the second elastic means 15b and freeing the second passage opening 5a: once the passage openings 5a, 5b are mutually adjoining, the working fluid is then free of crossing such first passage duct 3a, such first passage opening 5a, such second passage duct 3b and such second passage opening 5b. Obviously, by proceeding in reverse with respect to what is described above, namely eliminating the pressure in the working fluid, moving the female connection component 1a far from the male connection component 1b (for example along an opposite direction to the one shown by arrows C in FIG. 1), and extracting the projecting connection element 7b from the seat 7a, the enlarging end 21a is in turn extracted from the seats of the bush 17a and the thrusting element 19°, allowing the first 15a and the second elastic means 15b to take back the respective closing plugs 13a, 13b in their closing positions of the respective passage openings 5a, 5b.

The above described opening/closing means 11b, 11b thereby allow automatically opening and closing the related passage opening 5a, 5b during the connection and disconnection of the joint 1 according to the present invention, to adjust the fluid flow even under pressure and to guarantee the closure of the openings 5a, 5b once having disconnected the first 1a and the second component 1b.

Obviously, it is also possible to automatise the connection/disconnection operations of the joint 1 according to the present invention, for example through suitable hydraulic cylinders, lever/cam type kinematisms or other systems suitable for this purpose.

Figure 3:
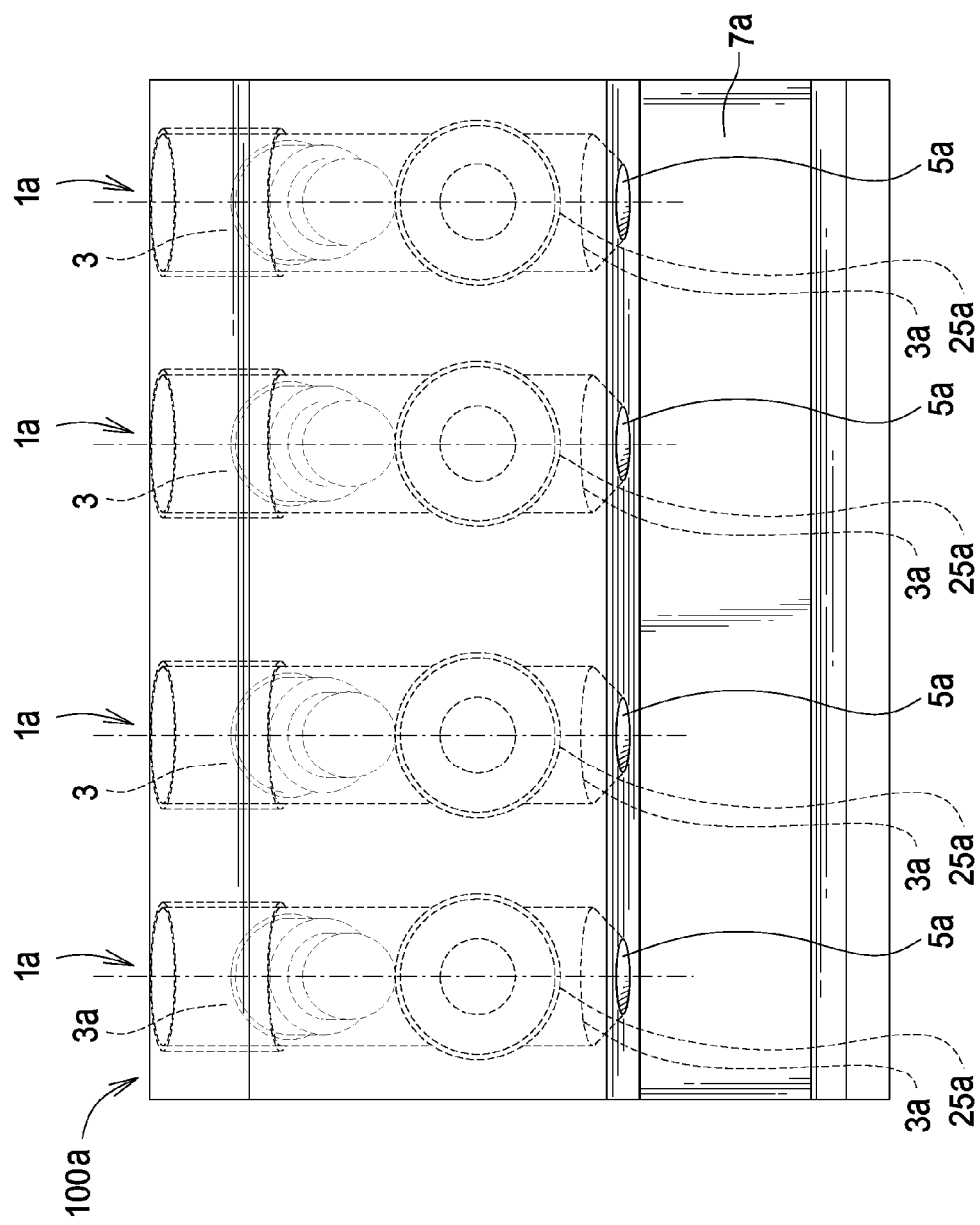
FIG. 3 shows a front sectional view of a preferred embodiment of a female connection component of the quick-connection hydraulic coupling joint according to the present invention.
Figure 4:
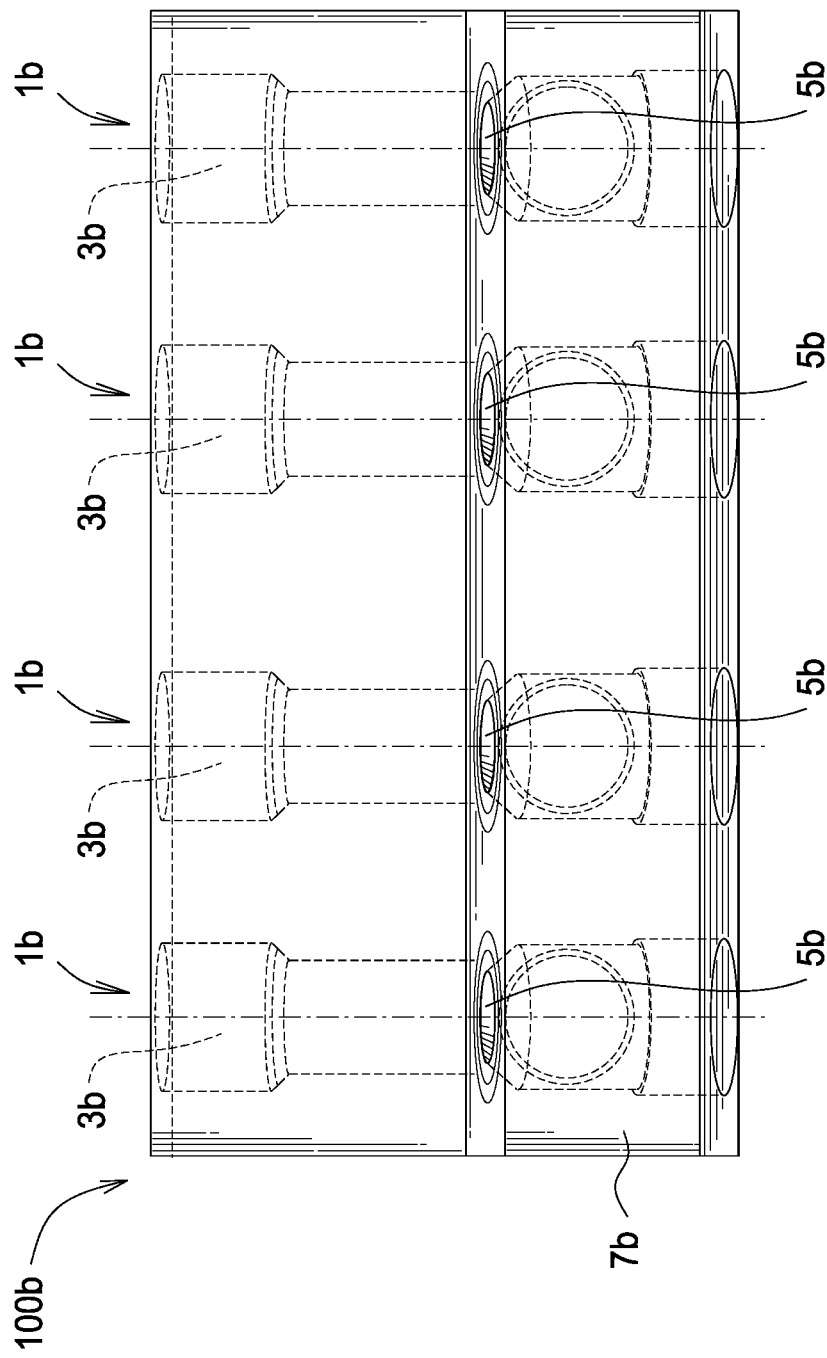
FIG. 4 shows a front sectional view of a preferred embodiment of a male connection component of the quick-connection hydraulic coupling joint according to the present invention.

Moreover, as it is possible to note in particular in FIGS. 3 and 4, it is possible to provide that the joint 1 according to the present invention is, depending on specific functional needs, of the type with multiple channels comprising at least one female connection component 100a with multiple channels and at least one male connection component 100b with multiple channels, such first female connection component 100a with multiple channels comprising two or more of such female connection components 1a as described above, arranged in parallel, and such male connection component 100b with multiple channels comprising two or more (preferably the same number) of such male connection components 1b as described above, also arranged in parallel: FIGS. 3 and 4 show as an example a joint according to the present invention composed of a female connection component 100a with multiple channels and of a male connection component 100b with multiple channels, each one of which respectively composed of four of such female 1a and male 1b connection components.

Figure 5:
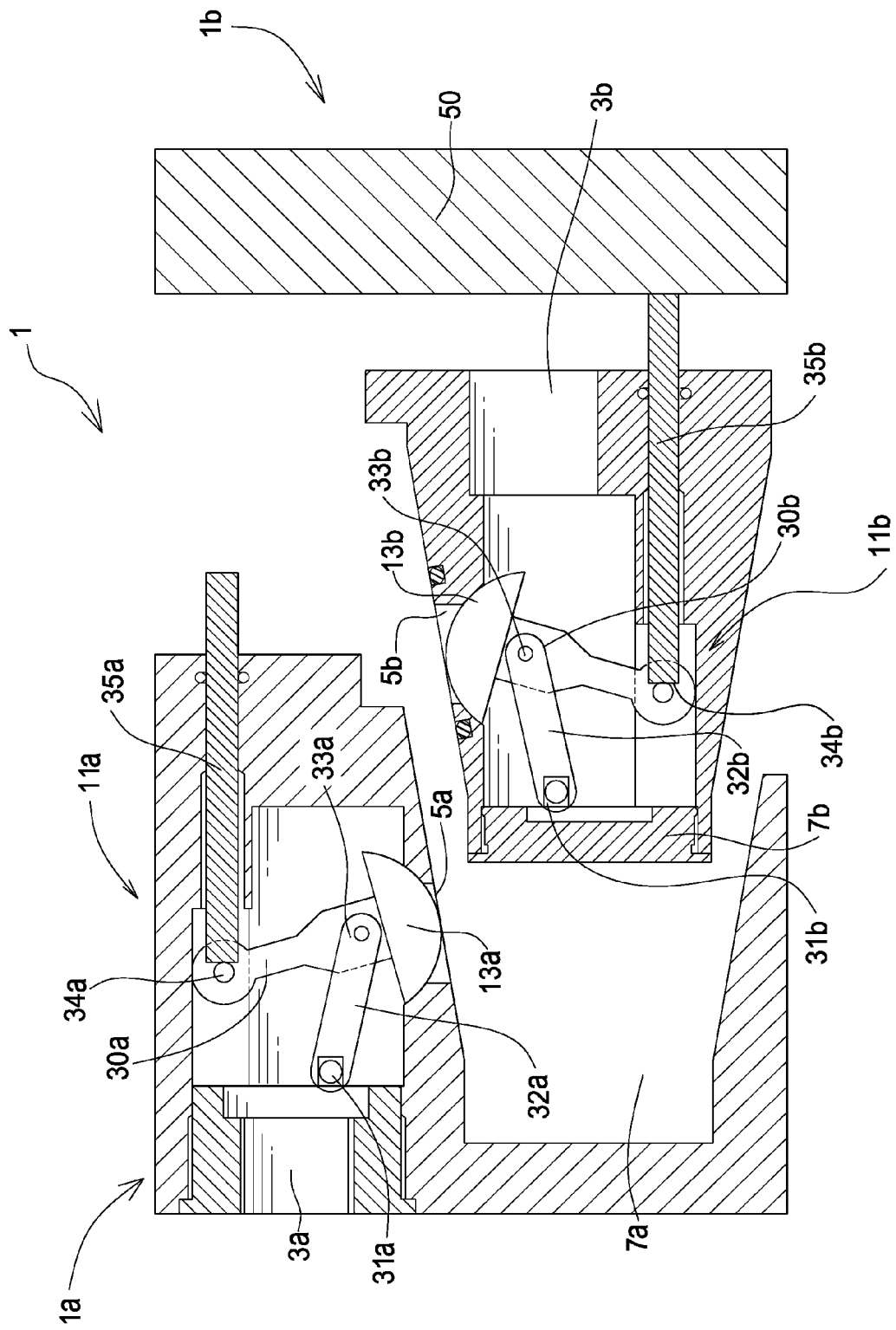
FIG. 5 shows another preferred embodiment of the quick-connection hydraulic coupling joint according to the present invention in an opened configuration.

FIGS. 5 and 6 show another preferred embodiment of the quick-connection hydraulic coupling joint of the present invention, respectively in an open and closed configuration.

The major difference with respect to the previously described hydraulic coupling joint is that the first and second closing plugs 13a, 13b are substantially shaped as a section of circle in the area closing their respective passage openings 5a, 5b, so that their opening/closing operations can be done swiftly and without interruptions.

Moreover, the first and second closing plugs 13a, 13b are actuated through the first and second opening/closing means 11a, 11b made as articulated driving systems, namely composed as follows.

The first closing plug 13a is connected to a first arm 30a rotatingly hinged at one end 33a to a second arm 32a, in turn fixedly hinged at another end 31a to the female connection component 1a, the first arm 30a being further rotatingly hinged at another end 34a to a first driving rod 35a adapted to slide inside the female connection component 1a, the first driving rod 35a being adapted to drive the first closing plug 13a from a closing position to an opening position of the first passage opening 5a when pushed by the female connection component 1a and abutted against a fixed abutment wall 50, the first driving rod 35a being further adapted to return to its rest position, where the first closing plug 13a closes the first passage opening 5a by means of elastic means (not shown, for example one or more springs), when the hydraulic coupling joint 1 must be opened.

Similarly, the second closing plug 13b is connected to a third arm 30b rotatingly hinged at one end 33b to a fourth arm 32b, in turn fixedly hinged at another end 31b to the male connection component 1b, the third arm 30b being further rotatingly hinged at another end 34b to a second driving rod 35b adapted to slide inside the male connection component 1b, the second driving rod 35b being adapted to drive the second closing plug 13b from a closing position to an opening position of the second passage opening 5b when pushed by the male connection component 1b and abutted against the fixed abutment wall 50, the second driving rod 35b being further adapted to return to its rest position, where the second closing plug 13b closes the second passage opening 5b by means of elastic means (not shown, for example one or more springs), when the hydraulic coupling joint 1 must be opened.

With the above arrangement, it is clear that the opening and closing positions of the first and second passage openings 5a, 5b are enabled in such a way as to prevent any oil leakage and any sudden pressure drop. In fact, the sequence of operating steps is as follows:
- starting from an opened position of the hydraulic coupling joint 1 (like the one in FIG. 5), firstly the female connection component 1a is pushed over the male connection component 1b which enters inside it;
- when the male and female connection components 1a, 1b are mutually coupled, they are together pushed towards the fixed abutment wall 50, and their respective first and second driving rods 35a, 35b simultaneously engage the fixed abutment wall 50 and are pushed by this latter one in order to actuate the various first, second, third and fourth arms 30a, 32a, 30b, 32b to rotate the first and second closing plugs 13a, 13b taking them to their opening positions of their respective first and second passage openings 5a, 5b: these opening positions, as clearly understandable, are enabled only when the male and female connection components 1a, 1b are already coupled and assembled together, thereby preventing oil leaks and oil pressure drops;
- on the contrary, when the hydraulic coupling joint 1 must be opened, firstly the first and second driving rods 35a, 35b simultaneously disengage the fixed abutment wall 50 and are pushed by their respective elastic means to their rest and closing positions, in order to actuate the various first, second, third and fourth arms 30a, 32a, 30b, 32b to rotate the first and second closing plugs 13a, 13b taking them to their closing positions of their respective first and second passage openings 5a, 5b;
- only when the first and second passage openings 5a, 5b are closed, can the female connection component 1a be disengaged and separated from the male connection component 1b, again without any problem of oil leak or pressure.

I claim:

1. A quick-connection hydraulic coupling joint comprising at least one female connection component and at least one male connection component, the female connection component being equipped with at least one first passage duct for at least one pressurised working fluid connected with at least one first passage opening of the female component, the male connection component being equipped with at least one second passage duct for the pressurised working fluid connected with at least one second passage opening of the male component, the male connection component being equipped with at least one projecting connection element on a surface of which the second passage opening is arranged, and the female connection component being equipped with a corresponding seat on the surface of which the first passage opening is arranged and is adapted to house therein the projecting connection element when the joint is in a connection position thereof in order to take the first passage opening next to and in fluidic connection with the second passage opening to share a common flow axis of the working fluid passing through the first passage duct, the first passage opening, the second passage duct and the second passage opening, or vice versa, wherein, when the female connection component and the male connection component are in the connection position, the male and female connection components share a virtual, front connection interface plane subtending with the flow axis an angle included between 5° and 15°;
    wherein the first passage opening is equipped with first opening/closing means and the second passage opening is equipped with second opening/closing means to allow/prevent a passage of the working fluid through the openings; and
    wherein the second opening/closing means operatively cooperate with the first opening/closing means, the second opening/closing means comprising at least one second closing plug spontaneously taken to close the second passage opening by at least one respective second elastic means, the first opening/closing means comprising at least one first closing plug spontaneously taken to close the first passage opening by at least one respective first elastic means, the first closing plug being integral with at least one end of a bush axially sliding along the flow axis, on an opposite end of the bush the first elastic means acting with pressure, at least one thrusting element being axially sliding inside the bush along the flow axis, the thrusting element operatively cooperating with the second closing plug to take the closing plug from a closing position of the second opening to an opening position of the second opening, the bush and the thrusting element comprising at least one seat for inserting an enlarging end of at least one enlarging element.

2. The joint of claim 1, wherein the projecting connection element has a section substantially shaped as a wedge or an isosceles trapezoid rotated by 90°, the seat having a shape corresponding to the projecting connection element.

3. The joint of claim 1, wherein, between the first passage opening and the second passage opening, at least one sealing element is interposed.

4. The joint of claim 1, comprising at least one female connection component with multiple channels and at least one male connection component with the respective multiple channels, the first female connection component with multiple channels comprising two or more of the female connection components arranged in parallel, and the male connection component with the respective multiple channels comprising two or more of the male connection components arranged in parallel.

5. A quick-connection hydraulic coupling joint comprising at least one female connection component and at least one male connection component, the female connection component being equipped with at least one first passage duct for at least one pressurised working fluid connected with at least one first passage opening of the female component, the male connection component being equipped with at least one second passage duct for the pressurised working fluid connected with at least one second passage opening of the male component, the male connection component being equipped with at least one projecting connection element on a surface of which the second passage opening is arranged, and the female connection component being equipped with a corresponding seat on the surface of which the first passage opening is arranged and is adapted to house therein the projecting connection element when the joint is in a connection position thereof in order to take the first passage opening next to and in fluidic connection with the second passage opening to share a common flow axis of the working fluid passing through the first passage duct, the first passage opening, the second passage duct and the second passage opening, or vice versa, wherein, when the female connection component and the male connection component are in the connection position, the male and female connection component share a virtual front connection interface plane subtending with the flow axis an angle included between 5° and 15°; wherein the first and second closing plugs are substantially shaped as a section of a circle in an area closing the respective passage openings, the first and second closing plugs being actuated through the first and second opening/closing means made as articulated driving systems, and wherein, the first closing plug is connected to a first arm rotatingly hinged at one end to a second arm, in turn fixedly hinged at another end to the female connection component, the first arm being further rotatingly hinged at another end to a first driving rod adapted to slide inside the female connection component, the first driving rod being adapted to drive the first closing plug from a closing position to an opening position of the first passage opening when pushed by the female connection component and abutted against a fixed abutment wall, the first driving rod being further adapted to return to a rest position, where the first closing plug closes the first passage opening by means of the first elastic means when the hydraulic coupling joint must be opened.

6. The joint of claim 5, wherein the second closing plug is connected to a third arm rotatingly hinged at one end to a fourth arm, in turn fixedly hinged at another end to the male connection component, the third arm being further rotatingly hinged at another end to a second driving rod adapted to slide inside the male connection component, the second driving rod being adapted to drive the second closing plug from a closing position to an opening position of the second passage opening when pushed by the male connection component and abutted against the fixed abutment wall, the second driving rod being further adapted to return to a rest position, where the second closing plug closes the second passage opening by means of elastic means, when the hydraulic coupling joint must be opened.

7. The joint of claim 5, wherein the elastic means are springs.

8. The joint of claim 6, wherein the elastic means are springs.

9. A quick-connection hydraulic coupling joint comprising at least one female connection component and at least one male connection component, the female connection component being equipped with at least one first passage duct for at least one pressurised working fluid connected with at least one first passage opening of the female component, the male connection component being equipped with at least one second passage duct for the pressurised working fluid connected with at least one second passage opening of the male component, the male connection component being equipped with at least one projecting connection element on a surface of which the second passage opening is arranged, and the female connection component being equipped with a corresponding seat on the surface of which the first passage opening is arranged and is adapted to house therein the projecting connection element when the joint is in a connection position thereof in order to take the first passage opening next to and in fluidic connection with the second passage opening to share a common flow axis of the working fluid passing through the first passage duct, the first passage opening, the second passage duct and the second passage opening, or vice versa, wherein, when the female connection component and the male connection component are in the connection position, the male and female connection components share a virtual, front connection interface plane subtending with the flow axis an angle included between 5° and 15°;

wherein first and second closing plugs are substantially shaped as a section of a circle in an area closing their respective passage openings, the first and second closing plugs being actuated through the first and second opening/closing means made as articulated driving systems; and wherein the first closing plug is connected to a first arm rotatingly hinged at one end to a second arm, in turn fixedly hinged at another end to the female connection component, the first arm being further rotatingly hinged at another end to a first driving rod adapted to slide inside the female connection component, the first driving rod being adapted to drive the first closing plug from a closing position to an opening position of the first passage opening when pushed by the female connection component and abutted against a fixed abutment wall, the first driving rod being further adapted to return to a rest position, where the first closing plug closes the first passage opening by means of the first elastic means, when the hydraulic coupling joint must be opened.

* * * * *